US 12,256,215 B2
Mar. 18, 2025

(12) United States Patent
Fischer

(54) FACILITATING NETWORK CONNECTIVITY

(71) Applicant: NAGRAVISION SARL, Cheseaux-sur-Lausanne (CH)

(72) Inventor: Jean-Bernard Fischer, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,290

(22) Filed: Sep. 1, 2023

(65) Prior Publication Data
US 2024/0064508 A1 Feb. 22, 2024

Related U.S. Application Data

(63) Continuation of application No. 17/255,851, filed as application No. PCT/EP2019/066945 on Jun. 26, 2019, now Pat. No. 11,785,453.

(30) Foreign Application Priority Data

Jun. 29, 2018 (EP) .................................... 18305845

(51) Int. Cl.
H04W 12/04 (2021.01)
H04W 12/126 (2021.01)
(Continued)

(52) U.S. Cl.
CPC ......... *H04W 12/04* (2013.01); *H04W 12/126* (2021.01); *H04W 12/35* (2021.01); *H04W 12/63* (2021.01)

(58) Field of Classification Search
CPC ... H04W 12/04; H04W 12/126; H04W 12/63; H04W 12/35
See application file for complete search history.

(56) References Cited

U.S. PATENT DOCUMENTS 10,306,473 B2 * 5/2019 Roche .................... H04W 12/35
11,184,767 B2 * 11/2021 Kotay .................... H04W 12/08
(Continued)

*Primary Examiner* — Kambiz Zand
*Assistant Examiner* — Afaq Ali
(74) *Attorney, Agent, or Firm* — POLSINELLI LLP

(57) ABSTRACT

The present disclosure relates to a wireless token capable of representing a user network, the token being used to automatically provision an IoT enabled device to connect to the user network. Functions required to achieve this include: authenticate the token with the user network, and responsive to said authentication, obtain and store configuration information for enabling the token to communicatively couple one or more devices at or within a defined proximity to the token, with the user network; responsive to a wireless signal received from a given device among the one or more devices, establish a temporary secure communication channel between the given device and the token; and provide the configuration information from the token to the given device using the temporally secure communication channel, wherein the configuration information enables the given device to establish a connection with and operate in the user network based on the obtained configuration information.

19 Claims, 6 Drawing Sheets

(51) Int. Cl.
*H04W 12/30* (2021.01)
*H04W 12/63* (2021.01)

(56) References Cited

U.S. PATENT DOCUMENTS

| | | | |
|---|---|---|---|
| 2005/0105734 A1* | 5/2005 | Buer | G06F 21/35 380/270 |
| 2006/0219776 A1* | 10/2006 | Finn | G06K 7/0043 235/380 |
| 2013/0198813 A1* | 8/2013 | van Roermund | G06F 21/30 726/4 |
| 2017/0134378 A1* | 5/2017 | Corcoran | H04L 9/3218 |
| 2017/0149745 A1* | 5/2017 | Geng | H04L 41/0806 |
| 2019/0138707 A1* | 5/2019 | Hiltgen | G06F 21/34 |
| 2019/0306160 A1* | 10/2019 | Zehler | G06F 21/608 |

\* cited by examiner

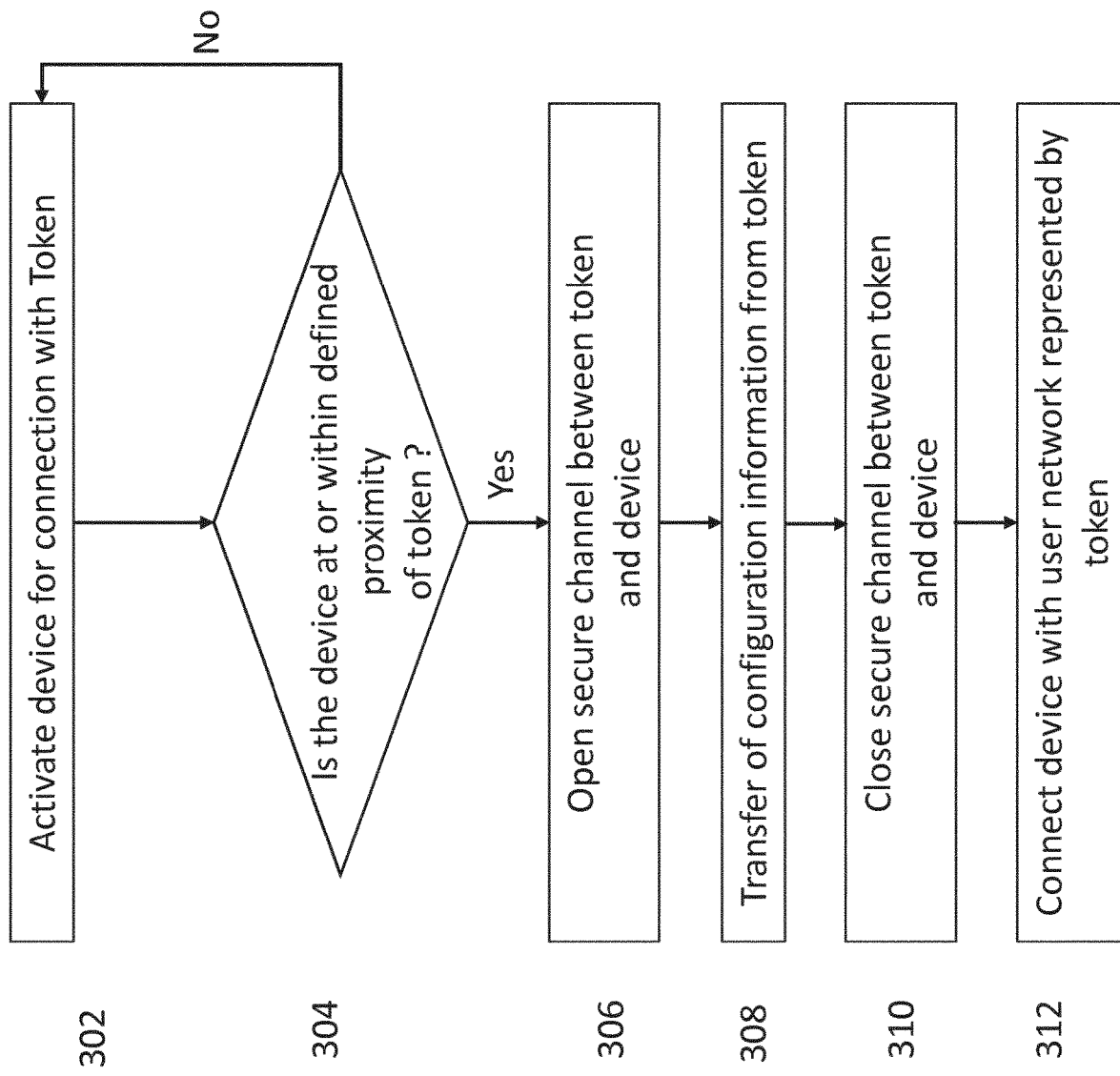

FACILITATING NETWORK CONNECTIVITY

CROSS-REFERENCES TO RELATED APPLICATIONS

This application is a continuation of U.S. patent application Ser. No. 17/255,851 filed Dec. 23, 2020, which is a U.S. National Stage of PCT Application No. PCT/EP2019/066945, filed Jun. 26, 2019, which claims the priority benefit of European Application No. 18305845.2, filed on Jun. 29, 2018, all of which are incorporated herein by reference in their entirety for all purposes.

FIELD

The present disclosure relates to provisioning one or more devices for connectivity with a user network using a token proximate to the one or more devices.

BACKGROUND

The Internet of Things (IoT) is a network of devices that allow the direct integration of the physical world with computer-based systems and networks. The devices are generally considered to be physical devices that have unique identifiers and are in most cases embedded with electronic sensors and/or actuators to monitor specific kinds of data. The devices are typically connected with private and/or public networks, which allow the live transfer and exchange of data with other connected devices and servers. A primary application of the IoT is an automated system whereby information from the physical world can be stored, accurately monitored and processed for real time decisions.

The key to IoT implementation is the interconnectedness of devices. Existing IoT frameworks provide a software platform that can automatically organise communication between devices and networks as well as manage security, privacy, data storage and bandwidth available for the connected devices. These requirements are generally met by predefined protocols in each IoT framework. In practice, this means that an IoT system can comprise millions of devices that communicate between themselves and other networks. Some examples of existing IoT frameworks include RTI™, Microsoft Azure™ IoT, Cisco™ IoT Cloud and the like.

Integrating or initialising several devices for connection to an IoT network requires a significant amount of manual work by an individual for each device, generally for security reasons. This manual work typically includes manual input of device credentials, network passwords, authentication codes and other security parameters and can be an arduous process, especially when involving an initial connection or appropriation of a large number of devices, for example dozens of devices. Some large scale IoT frameworks with many servers and IoT enabled devices attempt to streamline this process or remove human involvement from the registration of devices to increase time efficiency and avoid human error. These frameworks usually may require a physical connection to specific servers or mainframes in a fixed location. However, such largescale models may not be suitable for smaller IoT hubs or networks, for examples those associated with a user's household. The present disclosure provides techniques for overcoming existing drawbacks in integrating one or more IoT enabled devices with an IoT network, in particular where the IoT network is set up or maintained by a private individual, as can often be the case in a home or office IoT networking providing in home or in office integration of devices.

BRIEF DESCRIPTION OF THE DRAWINGS

Aspects and embodiments of this disclosure are now described by way of example for the purpose of illustration and with reference to the accompanying drawings, in which:

FIG. 3 depicts a flow diagram for provisioning an IoT device with connectivity to a user network.

DETAILED DESCRIPTION

Figure 1:
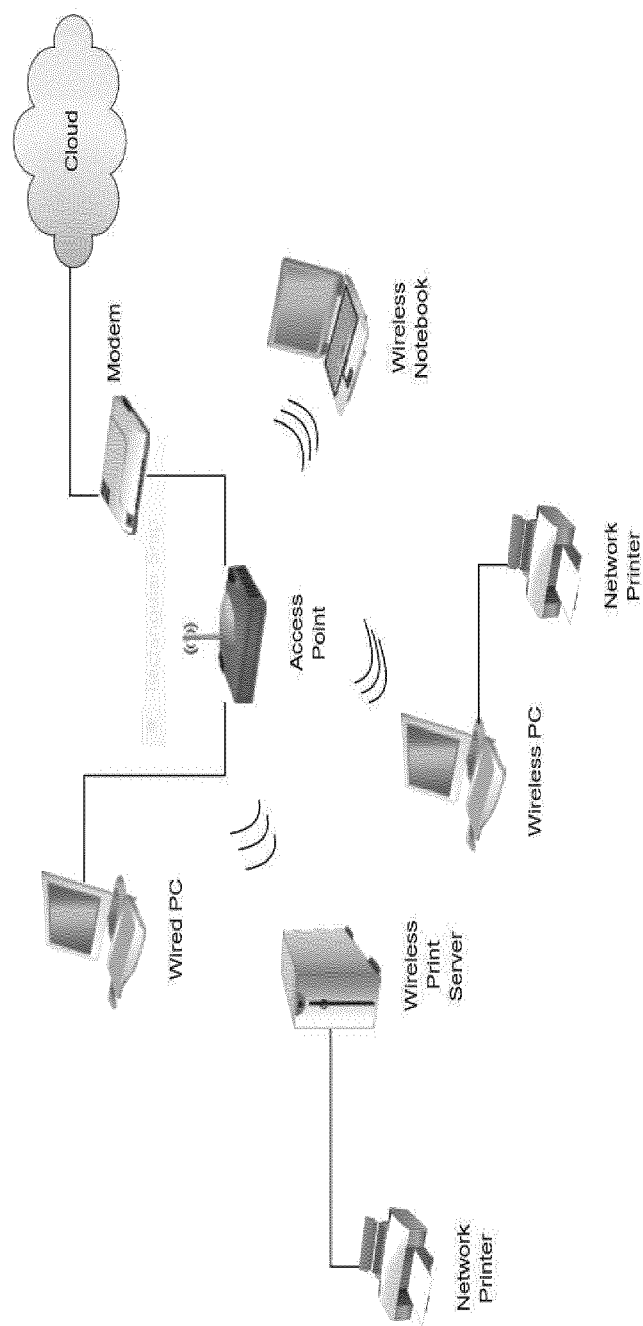
FIG. 1 depicts an example of an IoT network.

In overview, methods and devices in accordance with the disclosure relate to provisioning one or more IoT devices with connectivity to a user network. A portable token is associated with a user network, such as a home or office network. The token can enable one or more devices that are in proximity with it to connect to the user network. Therefore, the token herein described is understood to represent, or act on behalf of the user network, or one or more computing devices or server in the user network, to ensure that the device has all the information and/or permissions and/or settings required for it to establish a connection to the user network. Thus, the token acts as or represents the user network for provisioning a device to connect to the user network, so that such provisioning need not be done by the user network and is done by the token instead. The token being capable of representing the user network can be understood to mean the token being capable of association with the user network to facilitate connection of a device to the user network. Consequently, the token representing the user network can be understood to mean being associated with the user network to facilitate connection of a device to the user network. For example, the token may be associated with the user network by receiving configuration information for passing on to a device to be connected so that the configuration information need not be provided to the device by the user network but can instead be provided to the device by the token to enable the device to connect to the user network.

In a first aspect, a wireless token capable of representing a user network is disclosed. The token comprises one or more processing modules. The processing modules are configured to authenticate the token with the user network. To authenticate the token, the processing modules may be configured to provide data specific to the token to the user network. The data may comprise identifiers, passwords or the like that are transmitted to the user network, so that the user network can verify the identity of the token. In some embodiments, the user network performs one or more checks to establish that the token in question is authorised to have access to the user network. The user network to be represented by the token, once authenticated, may comprise a plurality of other IoT devices that are communicatively coupled with each other and share data with each other to operate in the user network. The processing modules are further configured to, responsive to said authentication, obtain and store configuration information for enabling the token to communicatively couple with the user network one or more devices that are located at or within a defined proximity to the token. In some embodiments, the obtained configuration information from the token comprises executable instructions to configure a given device among the one or more devices to communicate and share data with the plurality of IoT devices that are already part of the user network. For example, the configuration information may include network security permissions and/or access codes etc. In another preferred embodiment, the defined proximity is a defined distance or distance range, for example a distance in the range of less than 50 cm (0 to 50 cm), or less than 5 cm (0 to 5 cm), between the token and the one or more devices. The processing modules are also configured to, responsive to a wireless signal received from a device among the one or more devices, establish a temporary secure communication channel between the given device and the token, and provide the configuration information from the token to the given device using the temporary secure channel. The configuration information may comprise settings, parameters and the like and/or executable instructions, to enable the given device to establish a connection with and operate in the user network based on the obtained configuration information. Finally, in some embodiments the token may be configured to register the given device with the user network.

Advantageously the token can provision an IoT device with configuration information that the IoT device requires to connect to a user network, when the token is proximate to the IoT device. In this way, a secure, fast and efficient technique for automatically establishing a connection with a user network is enabled. In some embodiments, the configuration information that is to be transferred from the token to the device are in the form of executable instruction. This means that once transferred and installed on the device, the instructions are configured to run or be executed on the device to perform a function, or series of functions that cause the device to operate in a manner dictated by such functions. In some embodiments, the executable instructions are configured to perform such functions irrespective of the type of device, i.e. the executable instructions will perform the functions irrespective of the device that they are installed in.

In some embodiments, the configuration information comprises executable instructions to configure the given device to be unresponsive to any further configuration information received from one or more devices representing networks other that the user network that is associated with the token. For instance, the executable instructions may include updating one or more setting in the device or setting a flag once the configuration information from the token has been successfully installed. This setting or flag may be set to identify the token and/or user network, and thereby prevent running configuration information from devices or token that are not associated with the user network.1 Therefore, advantageously the IoT device that is provisioned by the token is prevented from connecting to a network other than the user network. This increases security for the IoT device and the user network by preventing unauthorised access by other networks.

In some embodiments, the configuration information from the token comprises executable instructions to configure the given device to respond to further or updated configuration information received from the same token, when the token is at or within the defined proximity. The executable instructions may further be configured to configure the given device to operate in the user network based on the received further or updated configuration information. Therefore, advantageously an IoT device provisioned by the token can be reconfigured for the user network by the same token at or within the defined proximity (and only by the same token where configuration by other tokens is prevented). This allows for secure updating of user network credentials, and other information such as setting, parameters or firmware updates, for the IoT device.

In some embodiments, the configuration information from the token comprises executable instructions that require the given device to be reset in the presence of the token at the defined proximity, prior to configuring the given device to operate based on further or updated configuration information from the user network or new configuration information from any other network. Furthermore, the configuration information may also configure the given device to be unresponsive to the device reset if the token is not present within the defined proximity of said one or more devices. Therefore, in such embodiments, an IoT device provisioned by the token can be reset to enable it to be configured for a different network and/or reconfigured for the same user network, but only when the token is in proximity of the IoT device. This secures the IoT device against unauthorised configuration or reconfiguration requests by requiring the device to be reset only when the token is proximate to it. Furthermore, the additional security of allowing a reset to take place only when the token is in proximity of the device prevents an unauthorised reset which may erase any earlier settings for a user network.

In some embodiment, the token is configured to communicate with the one of more devices using a short-range communication protocol such near-field communication (NFC) or Bluetooth™. In some embodiments, the token may be wearable by a user and may take the form of a ring, armband, necklace, key card or fob or other wearable device, or may be embedded in a device such as a mobile phone, smart phone, tablet computer, smart watch, or the like.

In a second aspect, a device capable of wireless communication is disclosed. The device comprises one or more processing modules configured to operate to detect a token as described above proximate to it. The one or more processing modules are configured to obtain configuration information from the token for registering the device with the user network represented by the token to establish a connection with the user network, and to operate in the user network based on the obtained configuration information.

For example, to operate based on or on the basis of configuration information is understood herein to mean that the device can operate in the user network using the configuration information directly or indirectly.

In some embodiments, the device is capable of communication with a plurality of tokens as described above, each representing the same user network. This device is thus capable of obtaining configuration information that is specific to each of said plurality of tokens for operating in the user network when the device is activated by one token among the plurality of token. Therefore, advantageously the device can be configured to operate in a user network in a certain manner based on the configuration information of the token that activates the device. This provides for applications where one or more tokens have one or more different permissions associated with the same user network, such as multiple personalised key cards for a system of locks in a building.

In some embodiments, the device is an IoT enabled device, wherein the user network is an IoT network including a plurality of other IoT devices registered to the network.

In a third aspect, a user network represented by at least one token as described above is disclosed. The user network comprises at least:

a plurality of devices, for example as described above, that are communicatively coupled with each other and share data with each other to operate in the user network. The user network also comprises a router or a control module for connecting the user network with one or more external wireless networks and a database storing information relating to each of plurality of devices and data exchanged between them in the user network.

Thus, the above-mentioned router, control modules, data base etc. are part of the same user network that is associated with the token. In some embodiments, the token may be communicatively coupled with all devices in the user network to share. For instance, the token will be able to connect to the database or one or more registers in the network to share details of one or more devices that has recently been provisioned with configuration information from token.

In a fourth aspect, a method for provisioning connectivity with a user network for one or more devices capable of wireless communication is disclosed. The method comprises detecting, by the one or more devices, a token proximate to the one or more devices, the token having been previously authenticated for managing communication of the one or more devices with the user network. The token then establishes a temporary secure communication channel between the token and the one or more devices and the one or more devices obtain, via the temporary secure communication channel, configuration information from the token for registering the one or more devices with the user network. The one or more devices are then connect to the user network and are configured to then operate in the user network based on the obtained configuration information.

In a fifth aspect, a system for implementing the method of the fourth aspect is disclosed. The system comprises at least a user network as set out in the third aspect; at least one token as set out above in the first aspect for representing the user network; and one or more devices as set out above in the second aspect, to be connected to the user network.

Some specific components and embodiments are now described by way of illustration with reference to the accompanying drawings, in which like reference numerals refer to like features With reference to FIG. 1, for the purpose of illustration, the user network will be described in the following as an IoT network that allows transfer of data between connected devices. Typically, devices that connected within an IoT network include routers for directing communication within and outside the IoT network, control panels and/or servers to control data transfer, one or more databases to store information, one or more computing devices using the data transferred etc. FIG. 1 illustrates an example of an IoT network. It will be appreciated that the present description is not limited to the user network being an IoT network.

Figure 2A:
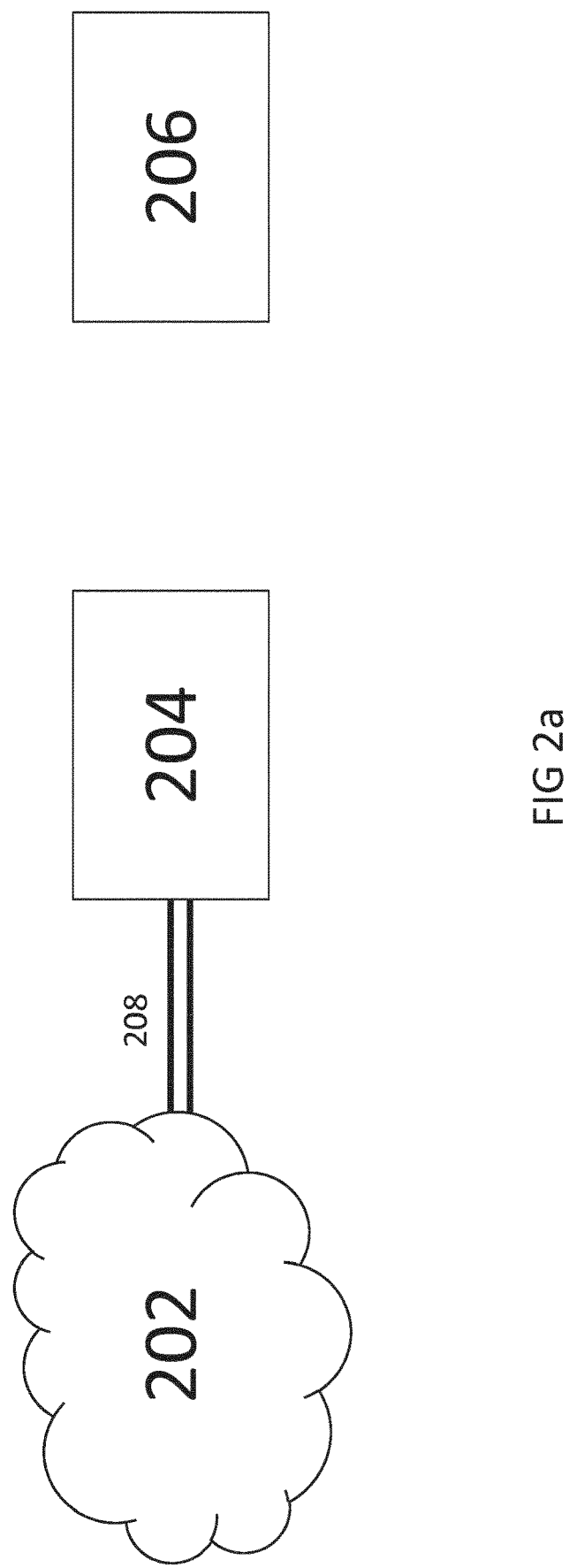
FIG. 2a depicts authentication of a token with a user network, for example a home or office network.

With reference to FIG. 2a, a token 204 is seen for 204 representing a user network 202, as explained above, and be used for connects one or more IoT enabled devices 206 to the user network 202. The token 204 can be a mobile phone, an application running on a mobile phone, a smartwatch, or any wearable device that is to be authenticated for association with an existing user network 202, before the token 204 can represent the user network 202. For example, the user network 202 may be a trusted or private user IoT network within a home or office space etc. The user network 202 may be one or an IoT network, home network or office network.

The authentication of the token 204 with the IoT network 202 can be established by known wireless communication protocols and/or using a secure and reliable end-to-end session 208 for such authentication. As part of the authentication process, transfer of one or more of security credentials of the user network 202, permissions specific to the token 204 in question, data verification codes, passwords and the like and other security information takes place using one or more known device authentication techniques. Once the token 204 is authenticated, the device becomes a trusted device for representing the user network 202.

Once authentication of the token 204 with the user network 202 is successful, the token 204 is provided with data and/or generic device credentials for securely provisioning one or more devices 206 to connect with the user network 202. Thus, provisioning is understood as the process by which the one or more devices 206 can be enabled by the token to connect to the user network 202. Such data and/or generic device credentials is preferably transferred to the token via the same secure communication link 208. Some examples of this may be executable instructions to implement unique network and device security permissions, executable instructions to set up network and device credentials for communication, unique identifiers, access codes etc., which are collectively referred to herein as configuration information. The configuration information may preferably be encrypted during the transfer, to ensure secure connectivity and transfer of configuration information between the user network 202 to the token 204. Preferably, one or more processing modules or a control system or server within the user network 202 is responsible for providing such configuration information from the user network 202 to the token 204.

Once the configuration information, which is specific to the token 204 from user network 202, is installed in one or more processing and/or storage modules of the token 204, the token is then enabled to provision one or more devices 206 to be connected to or associated with the user network 202. When the configuration information from the token 204 is installed on a device 206, as will be explained in more detail below with reference to FIG. 2b, the device 206 will then be enabled to automatically join or connect to the user network 202 without any further action required to be taken. The device 206 is not part of the user network 202 prior to provisioning by the token 204, as depicted in FIG. 2a, and is thus yet to be integrated or connected with the user network 202. The provisioning of the device 206 with configuration information may also be carried out when the token in not within a location boundary associated with the network or network range, e.g. if the user network 202 is a network in a user's home, the token can preferably enable a new device 206 to be provisioned for connectivity with the user network 202 outside of the user's home location or outside a pre-defined network perimeter of the user network 202 or out of range of the user network 202.

More than one token 204 may be authenticated to represent the user network 202. For instance, in a household with four inhabitants, each inhabitant may each have their own token 204 that may be enabled to provision one or more device 206 to connect to the user network 202, for example based on configuration information that is specific to each token 204. In some embodiments, when one or more tokens 204 are authenticated by user network 202, a register of such tokens 204 may be generated or updated within the user network 202, and any new or further authenticated tokens 204 can be added to the register. More than one device 206 can be connected to the user network 202 by a token 204. For instance, a household with several IoT devices such as smart lights and heating systems, set top boxes, alarm systems, smart kitchen appliances, stereo systems etc. is envisioned. A register of all such IoT enabled devices connected to the user network 204 may be generated, and any new devices 206 that are successfully connected to the user network 202 by one or more tokens 204 are then added to this register.

Registers with information in relation to token(s) 204 or connected device(s) 206 may be stored and accessed from a database or a secure storage module, which may be a device that is part of the user network 202; or the registers may be stored at and accessed from a cloud storage platform via a gateway or router that is within the user network 202.

Figure 2B:
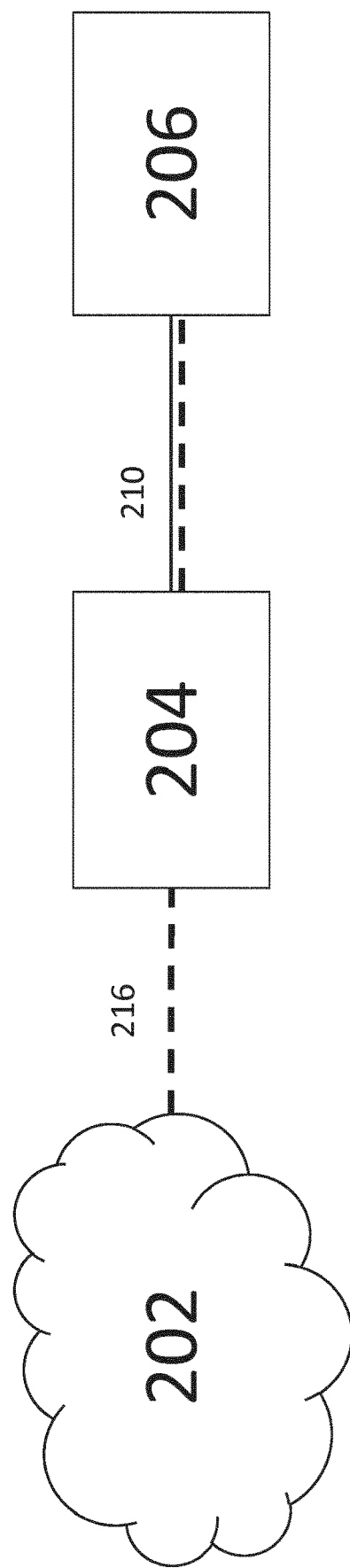
FIG. 2b depicts provisioning an IoT device for connection with the user network using the authenticated device.

With reference to FIG. 2b, using a token 204 that has already been authenticated by a user network 202 for provisioning a device 206 to connect with the user network 202 is now described. The token 204, user network 202 and device 206 in FIG. 2b are understood to be the same as the token 204, user network 202 and device 206 in FIG. 2a. Establishing connectivity or initialising a communication session using a private or home WiFi network is a common method for connecting devices to an access point for the user network 206. However, when there are many of potential devices in the range of WiFi connectivity, this causes difficulty in selecting a device for connection. Additionally, secure communication with a new device, not previously connected to the user network 202 is presently possible with the individual input of user IDs, passwords, etc or a manual action in relation to activating a WiFi button or the like within the user network 202, that can detect and register new devices. This process is time consuming and involves repeating the same time-consuming process for each new device that requires to be connected to other devices in the user network 202.

For the token 204 to provision a device 206 to connect to an associated IoT network, which the token represents, the token 204 establishes a connection with the device 206. Such connection between the device and token is established using methods such as near-field communication (NFC), radio-frequency identification (RFID) or any other proximity-based communication methods that both, the token 204 and the device 206 are enabled for. In a preferred implementation, the communication link 208 in FIG. 2a for authentication may be closed, or indeed replaced by a further communication link 216 so that the user token 204 after authentication may still be connected to the user network 204.

The connection between a token 204 and a device 206 in a preferred implementation is possible when the device is at or within a predefined proximity or distance, for example 20 to 50 centimetres, or in some cases less than 20 centimetres, from the token. For example, NFC a range of 20 centimetres, and Bluetooth™ can have different ranges depending on emission power of a device, i.e. class 3 has a range of 1 meter and class 4 has a range of less than 5 meters. Although a predefined proximity or distance is not to be limited to the above-mentioned distances, ideally it is a preference that the distance is not more than 1 meter, away. In some embodiments, the defined proximity may be the same as the distance dictated by the short-range communication method that is used between the token 202 and the device 206 that is to be provisioned. In other embodiments, the defined proximity may be a set distance which may be enforced on the token 204, for instance a setting for the token 204 that prevents the token 204 from connecting to a device, such as device 206 that is not already part of the user network 202 unless it is at or within the set distance.

In some implementations, a feature such as a button on the device 206 that is to be connected may need to be activated to search and detect a token 204 proximate to it. Such detection may be performed by the same known short range and proximity based wireless methods as explained above. This ensures that only the device 206 and the token 204 that is within the defined proximity of each other are connected for further provisioning. This prevents other undesired tokens or devices from provisioning the device to work with or connect to a different IoT network.

In some embodiments, the token 204 only functions when activated by the user, for example by fingerprint recognition, password input, face recognition, etc. This ensures that only the owner of the token 204 can activate it for connecting to one or more devices 206.

Once connected, a temporary secure communication channel 210 is established between the token 204 and the device 206. The secure channel 210 is a temporary one, defined by the same defined proximity as set out above, and functions for to ensure that configuration information, which is specific to a token 204, as described above in FIG. 2a, is successfully transferred. Hence, once the token 204 transfers configuration information to provision the device 206 to connect to the user network 202 represented by the token 204, the secure channel 210 is closed or disconnected as this channel 210 between the device 206 and the token 204 is no longer required. This is because after the transfer of the configuration information, the device 206 will be able to connect to the user network 202 and other devices in the user network 202 based on the data in the configuration information. If the configuration information transfer is not completed and the communication channel 210 is broken, for example if the token 204 is out of range, the device 206 may in some implementations returns to an original state. In some implementations, a signal may be sent from the user network 202 to the token 204 to validate that the configuration information is transferred to the device 206. In other implementations, such a signal can be initiated from the device 206 through the user network 202 to the token 204. In some implementations, the token 204 may be configured to provide a visual or audible notification of successful transfer of configuration information to a user.

When the secure channel 210 is established, the token 104b is configured to automatically provide the configuration information to the device 206206. Once the configuration information from the token 204 is installed on the device 206, the device 206 can now communicate with, and function as part of, the user network 202. Thus, by installing configuration information for the user network 202 using the token 204, the user network 202 no longer needs to send its credentials each time a new device is required to be registered to the user network 202, and no manual input of credentials is needed. This reduces available bandwidth usage within the user network 202, and enables an easier, secure and automatic provisioning of connectivity with the user network 202.

In some implementations, once the secure channel 210 within the defined proximity is closed and the device 206 has been provisioned with configuration information, there may be a communication link present between the device 206 and the token 204, which may function in the same manner as a communication link 216 that may exist between the network 202 and token 204 in FIG. 2b. The link 216 is not limited to short range or proximity-based protocols and is not intended for the transfer of configuration information. The link for example may merely indicates that the token 204 and/or the device are part the user network 202 and can be communicatively coupled with other devices that are part of the user network 202.

Figure 2C:
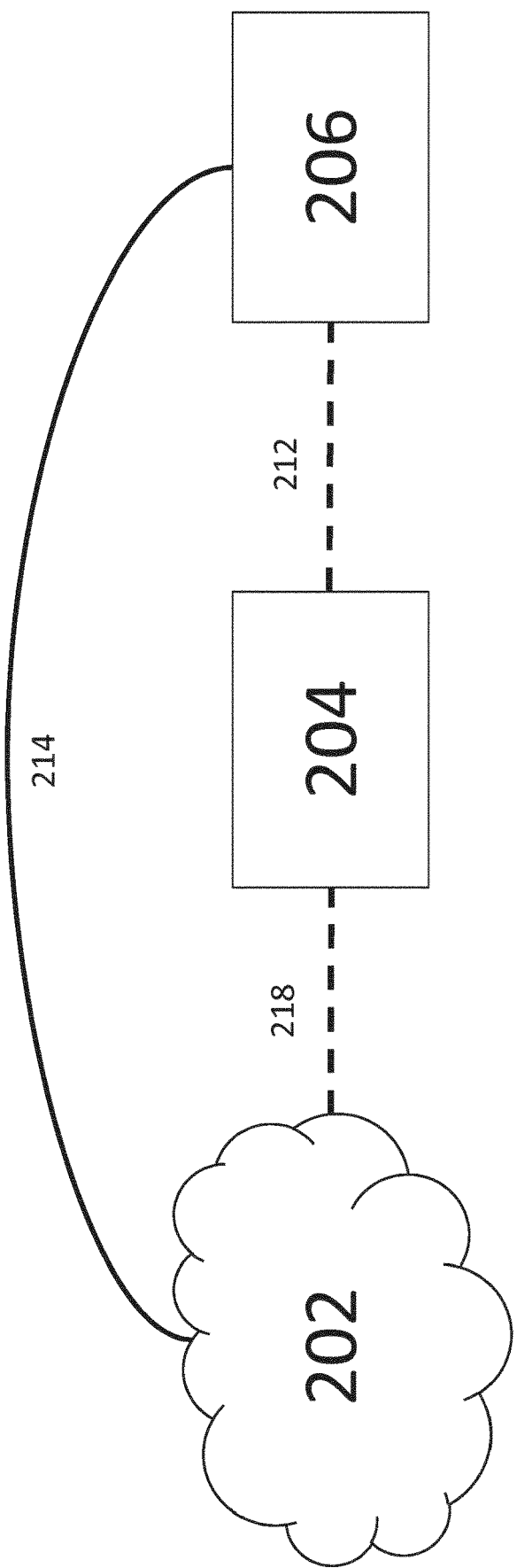
FIG. 2c depicts the IoT device connected with other devices in the user network after being provisioned by a token.

With reference to FIG. 2c, the operation of the device 206 that has now been provisioned with configuration information for connecting to a user network 206 using a token 204 is described. The configuration information that is sent from the token 204 to the device 206 comprises at least one set of executable instruction that perform one or more of the below functionalities of the device 206 to operate in the user network 202.

To implement a first functionality, the configuration information comprises executable instructions to configure the device 206 to establish a connection to the user network 202, as depicted by communication link 214 in FIG. 2c, without any further action or input required from the user network 202 or the device 206. This connection 214 with the user network is automatically established once the configuration information is installed in the device 206. As mentioned above, the configuration information comprises the required access codes, and permissions etc. required for the link 214 to be established.

To implement a second functionality, the configuration information comprises executable instructions to configure the device 206 to be unresponsive to any further configuration information received from one or more devices or token representing one or more networks other that the user network 202 that is associated with the token 204 that installed the configuration application. Thus, once provisioned by the token 204, the device 206 is prevented from connecting to a token or device or a network other than the user network 202, and connected devices and tokens associated with the user network 202. This increases security for the IoT device 206 and the user network 202 by preventing unauthorised assess by other networks.

To implement a third functionality, the configuration information from the token 206 comprises executable instructions to configure the device 206 to respond to additional configuration information received from the token 204, only when the token 204 is at or within the defined proximity. This is so that the device can then operate in the user network 202 based on the additional or new configuration information for the same network 202. This is to allow for a secure and easy update of user network 202 permissions specific to the configuration information from the token 204. This update can only be done using the same token 204, when in the defined proximity. In a preferred implementation, this process will require a further temporary secure channel, like channel 210 in FIG. 2b to be established.

To implement a fourth functionality, the configuration information from the token 204 comprises executable instructions that require a device reset for a given device 206 in the presence of the token 204 at the defined proximity, prior to configuring the device 206 to operate based on further or updated configuration information from the user network 202 or indeed any other network. Furthermore, the configuring information also configures the device 206 to be unresponsive to the device reset if the token 206 is not present within the defined proximity of the device 206. Thus, the device 206 provisioned by the token 204 can be reset to enable it to be configured for a different network and/or reconfigured for the same user network, with updated credentials, only when the token is within the defined proximity to the device 206. This secures the device 206 against unauthorised configuration or reconfiguration requests by requiring the token 204 to be present during any device reset, within the defined proximity.

In some implementations, after a secure channel for transfer of configuration information within the defined proximity, such as secure channel 210 in FIG. 2b, is closed, there may be a further communication link 212 generated between the device 206 and the token 204, which may then function in the same manner as a communication link 218 that may exist between the network 202 and token 204. The link 212 is not limited to short range or proximity-based protocols and is not intended for the transfer of configuration information. Such link may ensure that token 204 and the device 206, after being provisioned with configuration information, are part of the user network 202, and can be communicatively coupled with other devices that are part of the user network 202.

In some implementations, the device 206 is capable of communication with a plurality of tokens, each representing the user network 202. This device 206 is thus capable of obtaining configuration information that is specific to each of said plurality of tokens for operating in the user network 202 when the device 206 is activated by a token. The device 206 may be configured to operate differently, based on the specific configuration information received for each token. Preferably, once the device 206 is connected to the user network 202 via a first token 204 for the user network 202, disconnection from the user network 202 or connection to one or more other tokens, each with like functionality as the first token 204, is not envisioned possible without permission from the first token 204. This ensures that if the device 206 is stolen, it cannot function in another network without the associated token 204 to reset the device 206 to connect to a new network. Similarly, other tokens for the same user network 202 will also require permission from the first token 204.

In the case where the device 206 is a system of door locks in some premises or building and each inhabitant owns a token, which may be the same as token 204; one or more tokens can have full access to all locks/doors on the premises, while other tokens have limited access in varying degrees. For example, only tokens with full access to the all locks/door may have permissions that can open the lock, receive notifications when a lock is opened or closed or connect new tokens to the door lock, while tokens may only be able open the locks/doors in certain locations in the premises.

With reference to FIG. 3, a flow diagram summarising the method for provisioning a device with connectivity with a user network is disclosed. FIG. 3 is to be read and understood in conjunction with FIGS. 2a, 2b and 2c. The reference to the user network 202, token 204 and device 206 in the steps of FIG. 3 explained below, are the same as their respective counterparts explained in FIGS. 2a, 2b and 2c and include all the same functionality and features as explained above.

At step S302 the device 206 is activated so that the device 206 can detect a token 204 proximate to it, for example within 50 cm of the device, for example as explained above in relation to FIG. 2b.

At step 304 the detected token 204 is detected to be in proximity and, at step 306, in response to the detection, a temporary secure communication channel, such as the channel 210, for example described above in relation to FIG. 2b, is set up between the token 204 and the device 206.

In step 308, configuration information specific to the token 204 for provisioning the device 206 with connectivity to a user network represented by the token 204 is transferred from the token 204 to the device 206. This may, for example, take place in the manner as explained in FIG. 2b. The secure channel 210 is then closed at step 310, for example once the configuration information is installed on the device 206.

In step 312, the device provisioned with the required configuration information, for example in the same manner as explained in relation to the device 206 in FIG. 2c, can establish a connection to a user network 202 based on the configuration information that is specific to the token 204.

Figure 4:
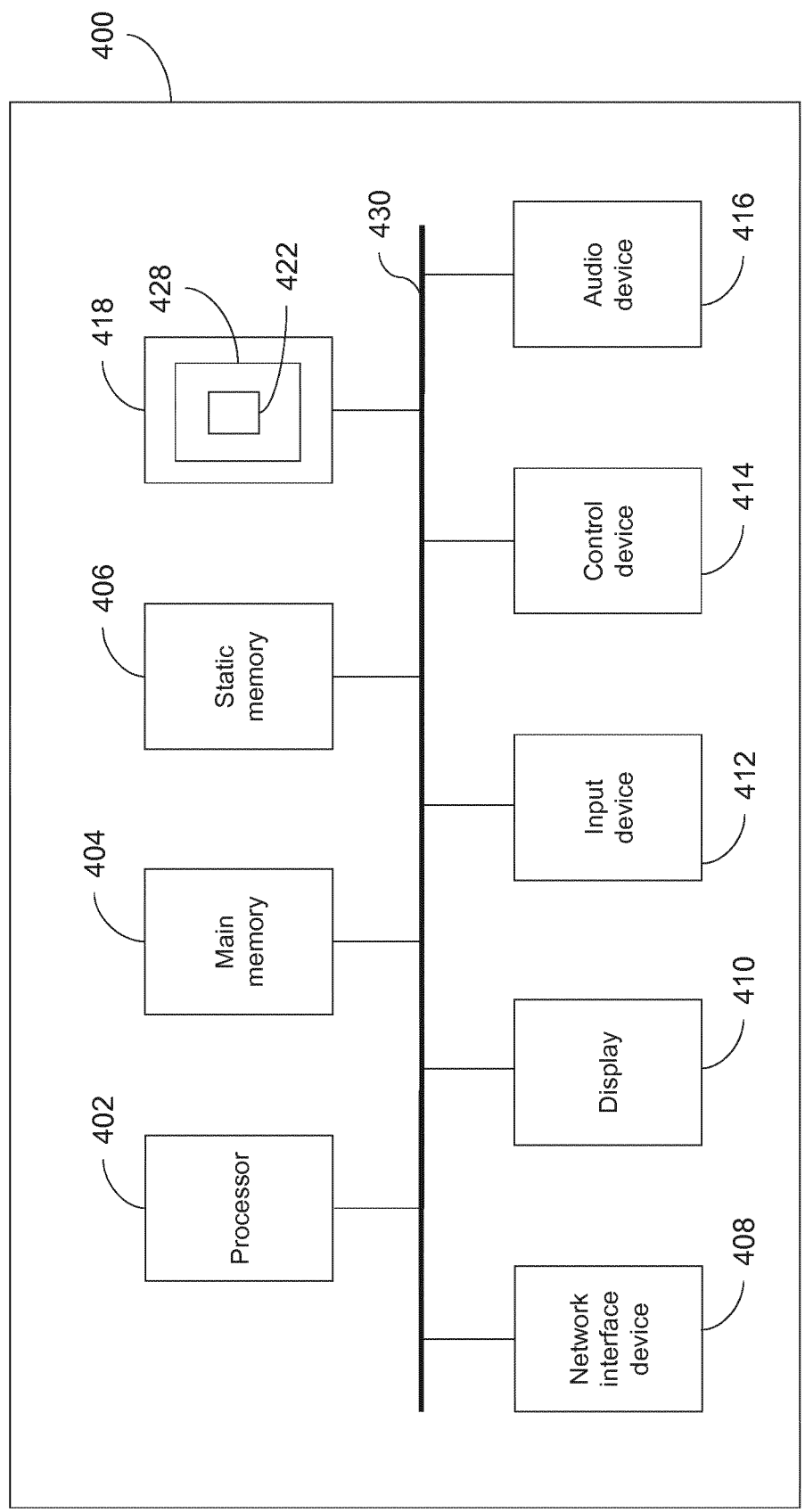
FIG. 4 is an example implementation of an IoT device and/or token.

FIG. 4 illustrates a block diagram of one implementation of a computing device 400 within which a set of instructions, for causing the computing device to perform any one or more of the methodologies discussed herein, may be executed. The computing device 400 may be a router or server in the user IoT network or one or more IoT enabled devices within the user network. Similarly, the computing device 400 may also be implemented to be the device or token described herein. In alternative implementations, the computing device 400 may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 400 includes a processing device 402, a main memory 404 (e.g., read-only memory (ROM), flash memory, dynamic random-access memory (DRAM) such as synchronous DRAM (SDRAM) or Rambus DRAM (RDRAM), etc.), a static memory 406 (e.g., flash memory, static random-access memory (SRAM), etc.), and a secondary memory (e.g., a data storage device 418), which communicate with each other via a bus 430.

Processing device 402 represents one or more general-purpose processors such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the processing logic (instructions 422) for performing the operations and steps discussed herein.

The computing device 400 may further include a network interface device 408. The computing device 400 also may include a video display unit 410 (e.g., a liquid crystal display (LCD) or a cathode ray tube (CRT)), an alphanumeric input device 412 (e.g., a keyboard or touchscreen), a cursor control device 414 (e.g., a mouse or touchscreen), and an audio device 416 (e.g., a speaker).

The data storage device 418 may include one or more machine-readable storage media (or more specifically one or more non-transitory computer-readable storage media) 428 on which is stored one or more sets of instructions 422 embodying any one or more of the methodologies or functions described herein. The instructions 422 may also reside, completely or at least partially, within the main memory 404 and/or within the processing device 402 during execution thereof by the computer system 400, the main memory 404 and the processing device 402 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-RAY or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "obtaining", "sending," "implementing,", "connecting", "detecting", "establishing", "authenticating" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A wireless token capable of representing a user network, the token comprising one or more processors configured to:
   authenticate the token with the user network;
   responsive to authenticating the token with the user network, obtain and store configuration information for enabling the token to couple a device within a defined proximity to the token with the user network;
   responsive to a wireless signal received from the device, establish a temporary secure communication channel between the device and the token; and
   provide configuration information from the token to the device using the temporary secure communication channel, wherein the configuration information enables the device to establish a connection with and operate in the user network based on the configuration information, wherein the configuration information from the token comprises executable instructions that, when installed and executed by the device, cause the device to:
      configure the device to respond to further or updated configuration information received from the token when the device is at or within the defined proximity to the token; and
      operate in the user network based on the further or updated configuration information.

2. The wireless token as claimed in claim 1, wherein the user network represented by the token comprises a plurality of other devices that are coupled with each other and share data with each other to operate in the user network, and wherein the configuration information from the token comprises instructions to configure the device to communicate and share data with one or more of the plurality of other devices.

3. The wireless token as claimed in claim 1, wherein the configuration information from the token comprises executable instructions that, when installed and executed by the device, cause the device to:
   configure the device to be unresponsive to further or updated configuration information received from one or more devices representing one or more networks other than the user network associated with the token.

4. The wireless token as claimed in claim 1, wherein the configuration information from the token comprises executable instructions that, when installed and executed by the device, cause the device to require a device reset for the device in the presence of the token at the defined proximity, prior to configuring the device to receive further or updated configuration information from the user network or one or more other networks.

5. The wireless token as claimed in claim 4, wherein the configuration information configures the device to be unresponsive to the device reset if the token is not present at or within the defined proximity of the device.

6. The wireless token as claimed in claim 1, wherein the defined proximity is a distance in a range of 20 to 50 centimeters (cm) between the token and the device.

7. The wireless token as claimed in claim 1, wherein the defined proximity is a distance that is less than 20 centimeters (cm) between the token and the device.

8. The wireless token as claimed in claim 1, wherein the token is configured to communicate with the device using near-field communication.

9. The wireless token as claimed in claim 1, wherein the token is a wearable by a user.

10. A method for a device capable of wireless communication with a user network, the method comprising:
    detecting, by the device, a token proximate to the device, the token being previously authenticated for managing communication of one or more devices with the user network;
    establishing a temporary secure communication channel between the token and the device;
    obtaining, by the device via the temporary secure communication channel, configuration information from the token enabling the device to establish a connection with and operate in the user network;
    wherein the device is configured to connect to and operate in the user network based on the configuration information from the token,
    wherein the configuration information from the token comprises executable instructions that, when installed and executed by the device, cause the device to:
       configure the device to respond to further or updated configuration information received from the token when the device is at or within a defined proximity to the token; and
       operate in the user network based on the further or updated configuration information.

11. A wireless token capable of representing a user network, the token taking the form of a ring, armband, necklace key card, fob or other wearable device, and the token comprising one or more processors configured to:
    authenticate the token with the user network;
    responsive to authenticating the token with the user network, obtain and store configuration information for enabling the token to couple a device within a defined proximity to the token with the user network;
    responsive to a wireless signal received from the device, establish a temporary secure communication channel between the device and the token; and
    provide the configuration information from the token to the device using the temporary secure communication channel, wherein the configuration information comprises executable instructions that, when installed and executed by the device, cause the device to establish a connection with and operate in the user network based on the configuration information.

12. The wireless token as claimed in claim 11, wherein the user network represented by the token comprises a plurality of other devices that are coupled with each other and share data with each other to operate in the user network, and wherein the configuration information from the token comprises instructions to configure the device to communicate and share data with one or more of the plurality of other devices.

13. The wireless token as claimed in claim 11 wherein the configuration information from the token comprises executable instructions that, when installed and executed by the device, cause the device to:
    configure the device to be unresponsive to further or updated configuration information received from one or more devices representing one or more networks other than the user network associated with the token.

14. The wireless token as claimed in claim 11, wherein the configuration information from the token comprises executable instructions that, when installed and executed by the device, cause the device to:
    configure the device to respond to further or updated configuration information received from the token when the device is at or within the defined proximity to the token; and
    operate in the user network based on the further or updated configuration information.

15. The wireless token as claimed in claim 11 wherein the configuration information from the token comprises executable instructions that, when installed and executed by the device, cause the device to require a device reset for the device in the presence of the token at the defined proximity, prior to configuring the device to receive further or updated configuration information from the user network or one or more other networks.

16. The wireless token as claimed in claim 15 wherein the configuration information configures the device to be unresponsive to the device reset if the token is not present at or within the defined proximity of the device.

17. The wireless token as claimed in claim 11 wherein the defined proximity is a distance in a range of 20 to 50 centimeters (cm) between the token and the device.

18. The wireless token as claimed in claim 11, wherein the defined proximity is a distance that is less than 20 centimeters (cm) between the token and the device.

19. The wireless token as claimed in claim 11, wherein the token is configured to communicate with the device using near-field communication.

* * * * *